Aug. 22, 1950     A. H. CADMAN     2,519,436
SEALING AND ELECTRICAL SHIELDING GASKET
Filed March 11, 1946     2 Sheets-Sheet 1
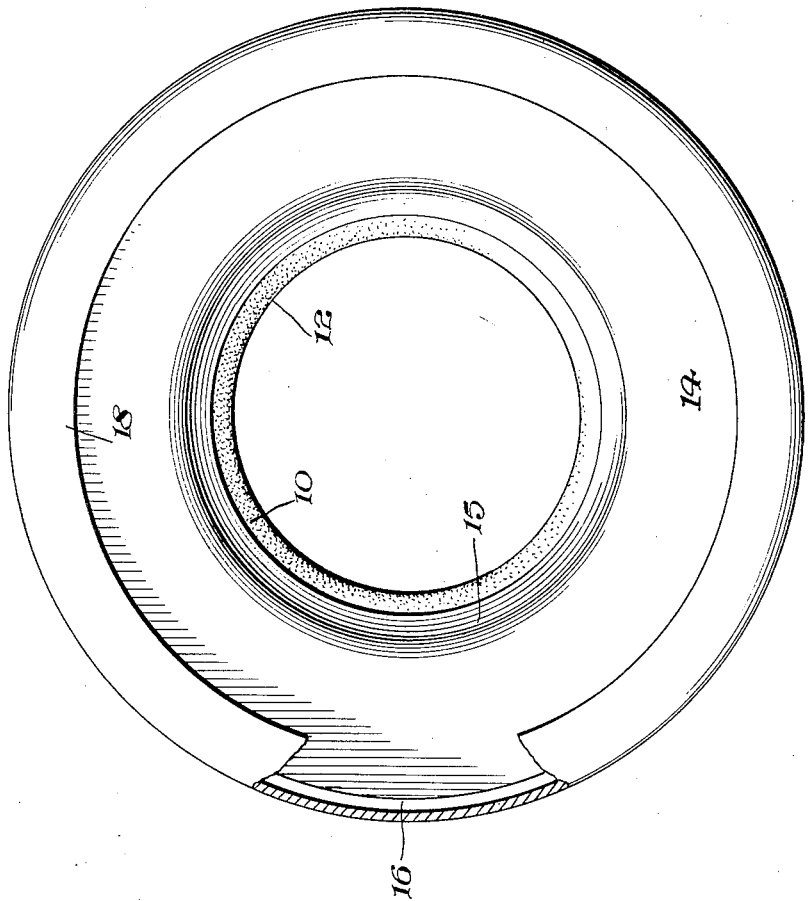
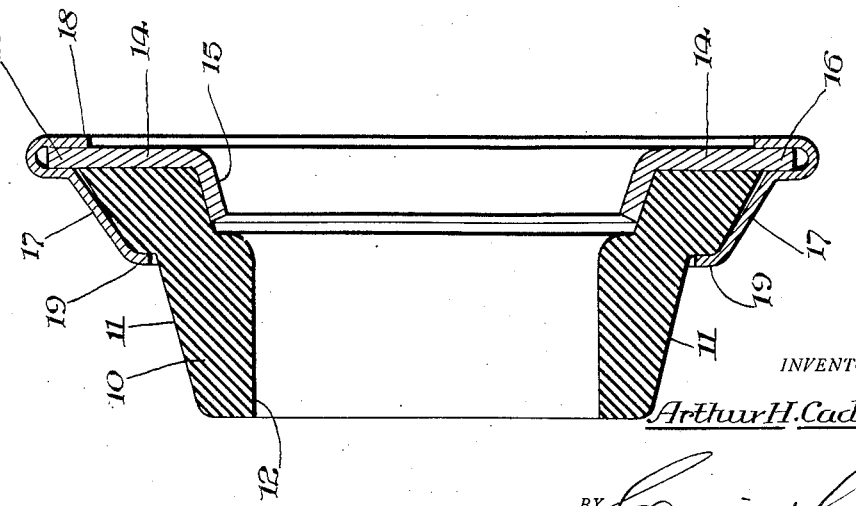
INVENTOR.
Arthur H. Cadman
BY Cousins & Cousins
ATTORNEYS, Aug. 22, 1950   A. H. CADMAN   2,519,436
SEALING AND ELECTRICAL SHIELDING GASKET
Filed March 11, 1946   2 Sheets-Sheet 2

INVENTOR.
Arthur H. Cadman
BY Cousins & Cousins
ATTORNEYS,

Patented Aug. 22, 1950

2,519,436

UNITED STATES PATENT OFFICE 2,519,436

SEALING AND ELECTRICAL SHIELDING GASKET

Arthur H. Cadman, Bloomfield, N. J., assignor to Breeze Corporations, Inc., Newark, N. J., a corporation of New Jersey Application March 11, 1946, Serial No. 653,483

1 Claim. (Cl. 174—35)

This invention relates to a gasket capable of producing a sealed and electrically conductive joint in an ignition system.

Where radio shielded cables are used, as in the ignition systems of airplane engines and similar structures, it is essential that a continuous metallic housing be provided around the wires to prevent the escape of electrical currents. The use of elbows, couplings and other features in the ignition system results in interruptions in the metallic housing which are potential sources of shielding failure.

An object of this invention is to provide a gasket which will form an electrical connection between the shielding metallic housings surrounding the elements incorporated into an ignition system and also prevent the entrance of moisture into the circuit.

Another object of this invention is to provide a gasket which may be used repeatedly without injury due to the application of excessive pressure.

A feature of this gasket is its inexpensive construction.

Another feature of this gasket is its metal to metal contact at the point of greatest pressure, thereby preventing the crushing of the rubber or dielectric portion of the gasket.

A final object of this invention is to provide a gasket which will not have its dielectric forced out of the surrounding metal by pressure.

The invention consists of the construction, combination and arrangement of parts, as herein described, illustrated and claimed.

In the accompanying drawings forming part hereof is illustrated one form of embodiment of the invention, in which drawings similar reference characters designate corresponding parts, and in which:

Figure 1 is a longitudinal section of the conducting gasket;

Figure 2 is an end view of the gasket, partly broken away, taken from the shielded end.

Figure 3:
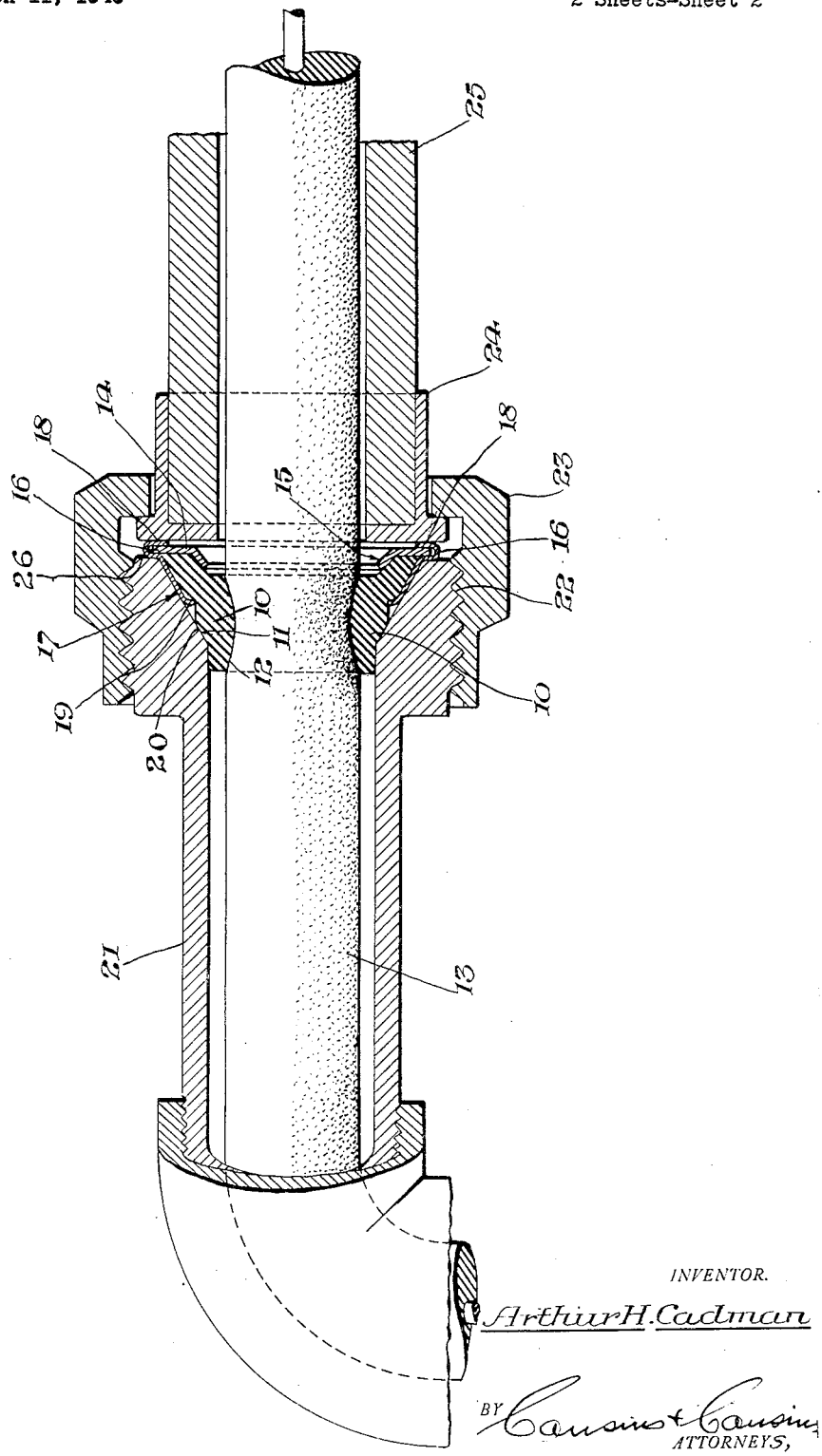
Figure 3 is a longitudinal section showing the gasket in one application.

Referring to the drawings, 10 represents a flexible dielectric sleeve having a tapered outer surface 11 as shown in Figure 1. An internal bore 12 is provided in the sleeve 10 to accommodate a cable or ignition wire 13. A copper ring 14 having an inwardly bent inner rim 15 is disposed upon the larger end of the tapered sleeve 10 with the rim 15 extending into the sleeve bore 12. The outside diameter 16 of the ring 14 is sufficiently great to extend beyond the face of the flexible sleeve 10 upon which it rests.

A copper shell 17 of a generally frusto-conical shape encases the sleeve 10 at the larger end thereof. The peripheral portion 18 of the shell 17 is bent over to clamp the extended edge 16 of the copper ring 14. An inwardly turned lip 19 on the opposite edge of the shell 17 serves to hold the shell 17 and ring 14 securely to the flexible sleeve 10 and prevents their separation.

The operation of this gasket will become apparent from an examination of Figure 3 in which can be seen the flexible sleeve 10 with its cooperating copper ring 14 and shell 17. The gasket is slipped over the end of a cable 13 and its tapered sides 11 seated within the matching taper 20 of the shielding elbow 21. The end of the elbow 21 is externally threaded 22 to receive a coupling nut 23. The coupling nut 23 engages with a ferrule 24 attached, as by soldering, to the conduit 25 of the ignition cable 13. When pressure is applied to the joint by tightening the coupling nut 23, the conducting gasket is compressed. This squeezes the shell 17 and the ring 14 between the ferrule 24 and the surface formed by the end face 26 of the shielding elbow 21, thereby completing the electrical contact between them. The tapered bore 20 of the elbow 21 also compresses the flexible dielectric of the sleeve 10, forcing it into the insulation of the cable 13. This results in a fluid tight joint at this juncture.

The pressure of the coupling nut 23 is absorbed by the metal of the shell 17 and ring 14, and does not injure the flexible dielectric sleeve 10. This greatly prolongs the life of the gasket because there is no flexible dielectric at this point to be broken off or squeezed out of the union. Moreover, the shape of the shell 17 is such that it alone makes the electrical contact between the ferrule 24 and the elbow 21. This construction improves the efficiency of the electrical contact.

Having thus fully described the invention, what is claimed as new and desired to be secured by Letters Patent of the United States, is:

In a conducting gasket, a flexible dielectric sleeve having a central bore and a tapered outside surface, a conducting shell tightly encasing the outer end of the sleeve, an inwardly flared lip on one end of the shell, said shell being secured to the sleeve by said inwardly flared lip, an outwardly disposed peripheral portion at the other end of the shell, an inwardly bent flat portion on the peripheral portion and a conducting ring having an inwardly bent central rim and an outside diameter greater than the larger face of the sleeve, positioned upon the face of the said sleeve and retained in place by the bent-over portion of the outwardly disposed peripheral member of the shell.

ARTHUR H. CADMAN.

REFERENCES CITED

The following references are of record in the file of this patent:

UNITED STATES PATENTS

| Number | Name | Date |
| --- | --- | --- |
| 1,690,839 | Roth | Nov. 6, 1928 |
| 1,908,137 | Gardner | May 9, 1933 |
| 1,957,001 | Searles | May 1, 1934 |
| 2,087,920 | Mascuch | July 27, 1937 |
| 2,113,735 | Mascuch | Apr. 12, 1938 |
| 2,114,750 | Stone | Apr. 19, 1938 |
| 2,183,004 | Boyd | Dec. 12, 1939 |
| 2,266,175 | Delaval-Crow | Dec. 16, 1941 |
| 2,398,376 | Hillman | Apr. 16, 1946 |